United States Patent
Kwon et al.

(10) Patent No.: US 10,430,301 B2
(45) Date of Patent: Oct. 1, 2019

(54) PROCESSOR SYSTEM AND FAULT DETECTION METHOD THEREOF

(71) Applicant: Electronics and Telecommunications Research Institute, Daejeon (KR)

(72) Inventors: Young-Su Kwon, Daejeon (KR); Kyung Jin Byun, Daejeon (KR); Nak Woong Eum, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 199 days.

(21) Appl. No.: 15/432,588

(22) Filed: Feb. 14, 2017

(65) Prior Publication Data

US 2017/0262011 A1    Sep. 14, 2017

(30) Foreign Application Priority Data

Mar. 14, 2016  (KR) .................. 10-2016-0030450

(51) Int. Cl.
| | |
|---|---|
| G06F 11/00 | (2006.01) |
| G06F 11/16 | (2006.01) |
| G06F 1/06 | (2006.01) |
| G06F 1/12 | (2006.01) |
| G06F 11/07 | (2006.01) |

(52) U.S. Cl.
CPC .......... *G06F 11/1608* (2013.01); *G06F 1/06* (2013.01); *G06F 1/12* (2013.01); *G06F 11/0724* (2013.01); *G06F 11/1675* (2013.01); *G06F 11/1679* (2013.01); *G06F 11/1641* (2013.01)

(58) Field of Classification Search
CPC ............ G06F 11/1608; G06F 11/1675; G06F 11/1679; G06F 1/06; G06F 1/12; G06F 11/1629; G06F 11/1633; G06F 11/1654; B60W 50/025; B60W 50/029-038
See application file for complete search history.

(56) References Cited

U.S. PATENT DOCUMENTS

| | | | | |
|---|---|---|---|---|
| 5,295,258 A | * | 3/1994 | Jewett ................. | G06F 1/12 714/12 |
| 5,880,945 A | * | 3/1999 | Borkar ................. | H02M 3/00 363/65 |

(Continued)

FOREIGN PATENT DOCUMENTS

| | | |
|---|---|---|
| JP | 4709268 B2 | 6/2011 |
| JP | 2014-096943 A | 5/2014 |
| KR | 10-1457557 B1 | 11/2014 |

*Primary Examiner* — Michael Maskulinski
(74) *Attorney, Agent, or Firm* — Rabin & Berdo, P.C.

(57) ABSTRACT

Provided is a processor system including a first processor driven by a first driving voltage and a first driving clock, a second processor driven by a second driving voltage and a second driving clock and configured to perform an identical task to the first processor, and a defect detector configured to perform level synchronization or clock domain synchronization on a first output signal provided from the first processor and a second output signal provided from the second processor to compare the first and second output signals, wherein the first and second driving voltages are respectively provided from mutually independent power supply sources and the first and second driving clocks are respectively provided from mutually independent clock generators.

12 Claims, 5 Drawing Sheets

(56) References Cited

U.S. PATENT DOCUMENTS

| | | | |
|---|---|---|---|
| 6,172,538 B1* | 1/2001 | Selwan | G06F 1/12 327/141 |
| 7,146,530 B2 | 12/2006 | Pomaranski et al. | |
| 7,206,966 B2 | 4/2007 | Barr et al. | |
| 7,437,582 B1* | 10/2008 | Parlour | G06F 1/12 327/530 |
| 8,417,990 B2 | 4/2013 | Ohkawa | |
| 2008/0218225 A1* | 9/2008 | Shibayama | G06F 1/12 327/144 |
| 2011/0254602 A1* | 10/2011 | Steiner | G06F 11/1679 327/158 |
| 2012/0278516 A1* | 11/2012 | Meichle | G06F 13/4059 710/52 |
| 2013/0024721 A1* | 1/2013 | Kabulepa | G06F 11/1641 714/5.1 |
| 2014/0208165 A1 | 7/2014 | Kang et al. | |
| 2014/0239923 A1* | 8/2014 | Alley | G05B 9/03 323/234 |
| 2014/0337659 A1* | 11/2014 | Rozas | G06F 1/12 713/600 |
| 2015/0341380 A1 | 11/2015 | Heo et al. | |
| 2016/0019126 A1 | 1/2016 | Kwon | |

* cited by examiner

PROCESSOR SYSTEM AND FAULT DETECTION METHOD THEREOF

CROSS-REFERENCE TO RELATED APPLICATIONS

This U.S. non-provisional patent application claims priority under 35 U.S.C. § 119 of Korean Patent Application No. 10-2016-0030450, filed on Mar. 14, 2016, the entire contents of which are hereby incorporated by reference.

BACKGROUND

The present disclosure herein relates to an electronic device, and more particularly, to a processor system including a plurality of processors and a fault detection method thereof.

A central processing units (hereinafter, CPU) is widely applied across the entire system semiconductor field. An application area of a CPU core extends to various application areas requiring data processing. Recently, as a driver assistance system, which requires high intelligence and accuracy such as an advanced driver assistance system (ADAS), is actively developed in a vehicle system etc., importance of an automotive electronic system gets higher. In particular, in order to recognize an environment outside a vehicle in place of a driver, a high performance CPU core having a driving clock of 500 MHz or higher tends to be applied to a vehicle system.

In order to recognize an external environment and analyze the recognized image and voice or a sensor input to control directly or indirectly a vehicle, capability to analyze and process massive data in real time is required. In particular, for driving assistance based on traffic line recognition, the recognized result may directly influence a steering apparatus, etc. at the time of vehicle driving. Accordingly, reliability of a CPU core may be particularly important to an application which may recognize data outside a vehicle and directly influence a steering apparatus of the vehicle. This is because driver's life may be directly influenced when a CPU core incorrectly operates due to a factor such as a voltage, current, or temperature.

In such a high performance CPU core, when an operation result of the CPU core influences steering, it is very important to ensure the reliability, namely, the CPU core operating according to an intended function.

SUMMARY

The present disclosure provides a processor system capable of simultaneously detecting a permanent fault and a transient fault of a multi-core system, and a fault detection method thereof.

The present disclosure also provides a processor system for removing mutual dependency between cores in a fault tolerant multi-core system in order to improve a fault detection rate and a fault detection method thereof.

An embodiment of the inventive concept provides a processor system including: a first processor driven by a first driving voltage and a first driving clock; a second processor driven by a second driving voltage and a second driving clock and configured to perform an identical task to the first processor; and a defect detector configured to perform level synchronization or clock domain synchronization on a first output signal provided from the first processor and a second output signal provided from the second processor to compare the first and second output signals, wherein the first and second driving voltages are respectively provided from mutually independent power supply sources and the first and second driving clocks are respectively provided from mutually independent clock generators.

In an embodiment of the inventive concept, a fault detecting method for a processor system, which includes a plurality of processors, includes: receiving a first output signal from a first processor driven by a first driving voltage and a first driving clock; receiving a second output signal from a second processor driven by a second driving voltage and a second driving clock and configured to perform an identical task to the first processor, level-synchronizing by converting a voltage level of the second output signal to a voltage level identical to the first driving voltage; clock-synchronizing by converting a clock domain of the level-synchronized second output signal identically to that of the first driving clock; and comparing the clock-synchronized second output signal with the first output signal; wherein the first and second driving voltages are respectively provided from mutually independent power supply sources and the first and second driving clocks are respectively provided from mutually independent clock generators.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, embodiments of the present invention will be described in detail with reference to the accompanying drawings so that the present invention can be easily realized by those skilled in the art.

Figure 1:
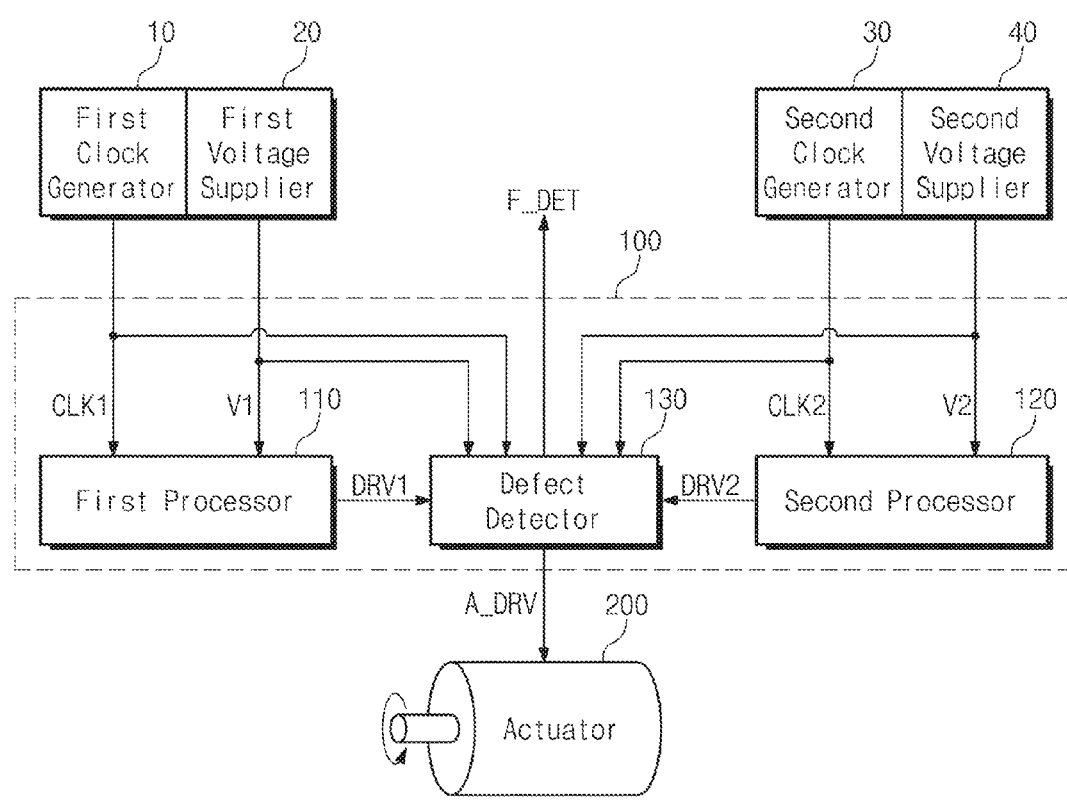
FIG. 1 is a block diagram of an automotive electronic system according to an embodiment of the inventive concept.

FIG. 1 is a block diagram of an automotive electronic system according to an embodiment of the inventive concept. Referring to FIG. 1, the automotive electronic system of an embodiment of the inventive concept may include a processor system 100 and an actuator 200. In addition, the automotive electronic system may include first and second clock generators 10 and 30, and first and second voltage suppliers 20 and 40 for respectively providing mutually independent driving clocks and driving voltages.

The first clock generator 10 and the second clock generator 30 are provided as mutually separated clock generating circuits. The first clock generator 10 may generate a first driving clock CLK1 to provide it to a first processor 110 and a defect detector 130. The second clock generator 30 may generate a second driving clock CLK2 to provide it to a second processor 120 and the defect detector 130. The first and second clock generators 10 and 30 may be located outside the processor system 100. The first and second driving clocks CLK1 and CLK2 are clock signals provided from sources that mutual interference or influence is blocked from each other. For example, the first and second driving clocks CLK1 and CLK2 may be respectively generated from phase locked loops (PLLs) or delayed locked loops (DLLs) which are independently driven. Accordingly, although the first driving clock CLK1 is exposed to noise or interference, the second driving clock CLK2 may maintain a normal frequency or phase.

The first power supplier 20 and the second power supplier 40 may be provided as mutually independent power supplying circuits. The first power supplier 20 may generate a first driving voltage V1 to provide it to the first processor 110 and the defect detector 130. The second power supplier 40 may generate a second driving voltage V2 to provide it to the second processor 120 and the defect detector 130. Accordingly, the first and second driving voltages V1 and V2 are independent voltages that mutual interference or influence is blocked from each other. For example, the first power supplier 20 and the second power supplier 40 may be respectively provided as mutually independently operating voltage regulators. Alternatively, the first and second power suppliers 20 and 40 may be respectively provided as mutually independently operating power management integrated circuits (PMICs). Accordingly, although the first driving voltage V1 varies according to noise or interference, the second driving voltage V2 may maintain a normal level. Here, it may be well understood that the first and second driving voltages V1 and V2 may be respectively provided as voltages of an identical level or different levels.

The processor system 100 generates an actuator driving signal A_DRV for controlling the actuator 200. The processor system 100 may include a first processor 110, a second processor 120, and the defect detector 130.

The first and second processors 110 and 120 respectively generate driving signals DRV1 and DRV2 according to a user's instruction or various sensing results. The first processor 110 may generate a first output signal DRV1 for controlling the actuator 200 according to instructions from the user or various sources. At the same time, the second processor 120 may generate a second output signal DRV2 for controlling the actuator 200 according to instructions from the user or various sources. Here, the first and second output signals DRV1 and DRV2 are control signals which instruct an identical operation and are provided to the actuator 200. However, the first and second output signals DRV1 and DRV2 may be delivered by different voltage levels or clocks.

Each of the first and second processors 110 and 120 may receive independent power. For example, the first processor 110 may be driven by the first driving voltage V1. On the other hand, the second processor 120 may be driven by the second driving voltage V2. The first and second driving voltages V1 and V2 are voltages provided from independent sources that mutual interference or influence is blocked from each other. For example, the first and second driving voltages V1 and V2 may be power supply voltages respectively provided from mutually independently operating voltage regulators. Accordingly, although the first driving voltage V1 varies according to noise or interference, the second driving voltage V2 may maintain a normal level. Here, it may be understood that the first and second driving voltages V1 and V2 may be provided as voltages with an identical level or different levels.

In addition, the first and second processors 110 and 120 may be respectively driven by independent clocks. For example, the first processor 110 may be driven by the first driving clock CLK1. On the other hand, the second processor 120 may be driven by the second driving clock CLK2. The first and second driving clocks CLK1 and CLK2 are clock signals provided from sources that mutual interference and influence are blocked from each other. For example, the first and second driving clocks CLK1 and CLK2 may be respectively generated from PLLs or DLLs which are independently driven. Accordingly, although the first driving clock CLK1 is exposed to noise or interference, the second driving clock CLK2 may maintain a normal frequency or phase.

The defect detector 130 receives to compare the first and second output signals DRV1 and DRV2. In addition, the defect detector 130 determines whether the first or second processor 110 or 120 is faulty according to the comparison result of the first and second output signals DRV1 and DRV2. In order to compare the first and second output signals DRV1 and DRV2 generated by mutually independent powers and clock signals, the defect detector 130 preferentially performs level synchronization or clock synchronization. The defect detector 130 may synchronize the first and second output signals DRV1 and DRV2 with reference to the driving voltages V1 and V2, and the driving clocks CLK1 and CLK2 provided to the first and second processors 110 and 120. At this point, the synchronization means synchronization to a signal having the same phase or delay.

The defect detector 130 compares the synchronized first and second output signals DRV1 and DRV2 and determines to be faulty when they are not identical. At this point, the defect detector 130 may block a control signal from flowing to the actuator and may output a fault detection signal F_DET. On the other hand, when the synchronized first and second output signals DRV1 and DRV2 are detected to be identical, the defect detector 130 may deliver an actuator driving signal A_DRY to the actuator 200.

The actuator 200 generates various powers in response to the actuator driving signal A_DRV. For example, the actuator 200 may be various electrical devices or hydraulic devices that perform rotational motions or reciprocating motions according to the actuator driving signal A_DRV.

Hereinbefore, operations of the processor system 100 and the actuator 200 according to embodiments of the inventive concept have been briefly described. The processor system 100 includes the first and second processors 110 and 120 to which powers and clocks are independently respectively provided. In particular, a fault occurring in any one of processors that perform an identical operation instruction may be detected by the defect detector 130. Detailed configurations of the first and second processors 110 and 120 and the defect detector 130 will be described in relation to FIG. 2.

Through the above-described configurations, when a fault occurs in any one of the processors 110 and 120 due to any external factor such as a voltage, current, or temperature, the other processor may normally operate. In addition, when detecting a fault of any one of them, various fault recovery operations may be performed with reference to the fault detection result.

As described above, reliability of a processor or a CPU core, or fault detection capability of the CPU core is particularly more important to an application, which may recognize external data of a vehicle to directly influence a vehicle steering device. Since the recognized result may directly influence the vehicle steering device, an incorrect operation of the processor due to a factor such as a voltage, current, or temperature may directly influence the driver's life. When such an operation result of the CPU core influences vehicle steering, it is very important to ensure stability of the CPU core.

To support the functional safety of a semiconductor circuit means that when an unintended fault occurs in the circuit due to various factors, it is possible to detect the fault and recover the function. ISO 26262, which is a standard for designing the functional safety of an automotive electronic system, defines an automotive safety integrity level (ASIL) rating according to circuit characteristics capable of managing a fault occurring in a semiconductor circuit for vehicle.

An unintended fault among operations of the circuit includes a phenomenon that particles such as a cosmic ray, neutron, and muon are accumulated inside the semiconductor circuit to cause a bit-flip at an unspecified time. Since the lifetime of the bit-flip is typically known as a 100 ps to 5 ns level, the flipped bit returns to a normal state after a certain time elapsed. However, when the defect occurs in a storage element, it is highly possible to consistently maintain the error. Accordingly, such a fault may be connected to a fault of the entire system according to a circuit characteristic and an occurring part and may act as a dangerous factor which causes a human accident.

In the inventive concept, when a fault occurs inside the CPU core due to a factor such as a voltage, current, or temperature at the time of an operation of the CPU core, a processor system from which mutual dependence between cores is completely removed is provided. In addition, the processor system according to the inventive concept may simultaneously detect a permanent fault and a transient fault in a fault-tolerant multi-core system.

Figure 2:
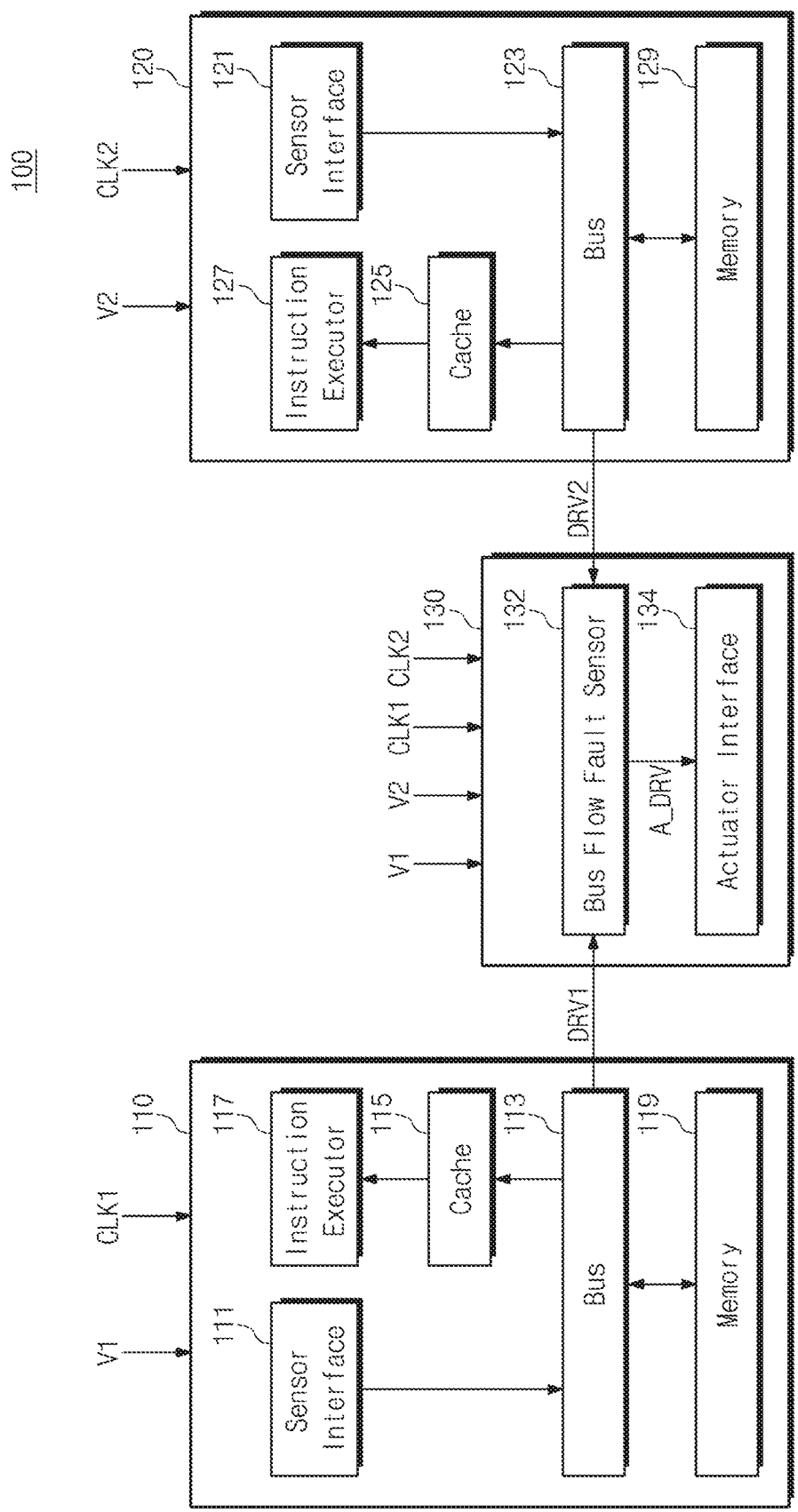
FIG. 2 is a block diagram illustrating in detail the processor system 100 of FIG. 1.

FIG. 2 is a block diagram illustrating in detail the processor system 100 of FIG. 1. Referring to FIG. 2, the processor system 100 may include processors 110 and 120 driven by independent power supplies and clocks, and a defect detector 130.

A first processor 110 may include a sensor interface 111, a bus 113, a cache 115, an instruction executor 117, and a memory 119. The sensor interface 111 is a component for communication with a sensor (not illustrated) mounted on the outside of the first processor 110. A sensing signal provided from the sensor may be converted by the sensor interface 111 into a signal that may be perceived and processed by the first processor 110.

The bus 113 provides a delivery path of data or control signals between various components inside the first processor 110. The bus 113 will deliver sensing signals, which are provided from the sensor interface 111, to the memory 119 or the cache 115. The bus 113 is required to provide a high transmission speed or a wide bandwidth for a high speed processor operation. Through the bus 113, the instruction executor 117 may access the memory 119. The bus 113 provides paths for data, addresses, or control signals through a plurality of channels. The cache 115 provides a cache memory for the instruction executor 117. The cache 115 temporarily stores data or control information used for various tasks performed in the instruction executor 117. The instruction executor 117 executes instructions provided from a user or an external device. The instruction executor 117 may generate a first output signal DRV1 as an instruction execution result to provide the first output signal DRV1 to the defect detector 130.

Various data may be loaded to the memory 119. For example, device drivers for driving an operating system or hardware may be loaded.

A second processor 120 may include a sensor interface 121, a bus 123, a cache 125, an instruction executor 127, and a memory 129. Since the sensor interface 121, the bus 123, the cache 125, the instruction executor 127, and the memory 129 are substantially identical to those of the first processor 110, descriptions thereabout will be omitted.

The first and second processors 110 and 120 may be configured from homogeneous multi-core processors or heterogeneous multi-core processors. However, the first processor 110 operates by the first driving voltage V1 and the first driving clock CLK1. In addition, the second processor 120 operates by the second driving voltage V2 and the second driving clock CLK2. The first driving voltage V1 and the first driving clock CLK1 are provided separately from the second driving voltage V2 and the second driving clock CLK2.

The defect detector 130 includes a bus flow fault sensor 132 and an actuator interface 134. The bus flow fault sensor 132 may compare the respective driving signals DRV1 and DRV2 of the first and second processors 110 and 120 to detect faults of the first and second processors 110 and 120. When the first and second processors 110 and 120 are determined to be in a normal state, the bus flow fault sensor 132 will output an actuator driving signal A_DRV. In addition, when at least one of the first and second processors 110 and 120 is determined to be faulty, the bus flow fault sensor 132 will block generation of the actuator driving signal A_DRV. Then the bus flow fault sensor 132 may output a fault detection signal F_DET. The fault detection signal F_DET may be delivered to a component for controlling the processor system 100. A fault recovery operation for the processors 110 and 120 may be performed according to information included in the fault detection signal F_DET.

The actuator interface 134 provides interfacing for delivering the actuator driving signal A_DRV to the actuator 200. For example, the actuator interface 134 may be a controller area network (CAN) controller, which is an interface for delivering a control signal to a throttle engine control unit (ECU) or a motor ECU in an automotive electronic system. Accordingly, since being a signal for actually controlling to drive a vehicle, the actuator driving signal A_DRV delivered to the actuator interface 134 should be a fault-tolerant signal.

Figure 3:
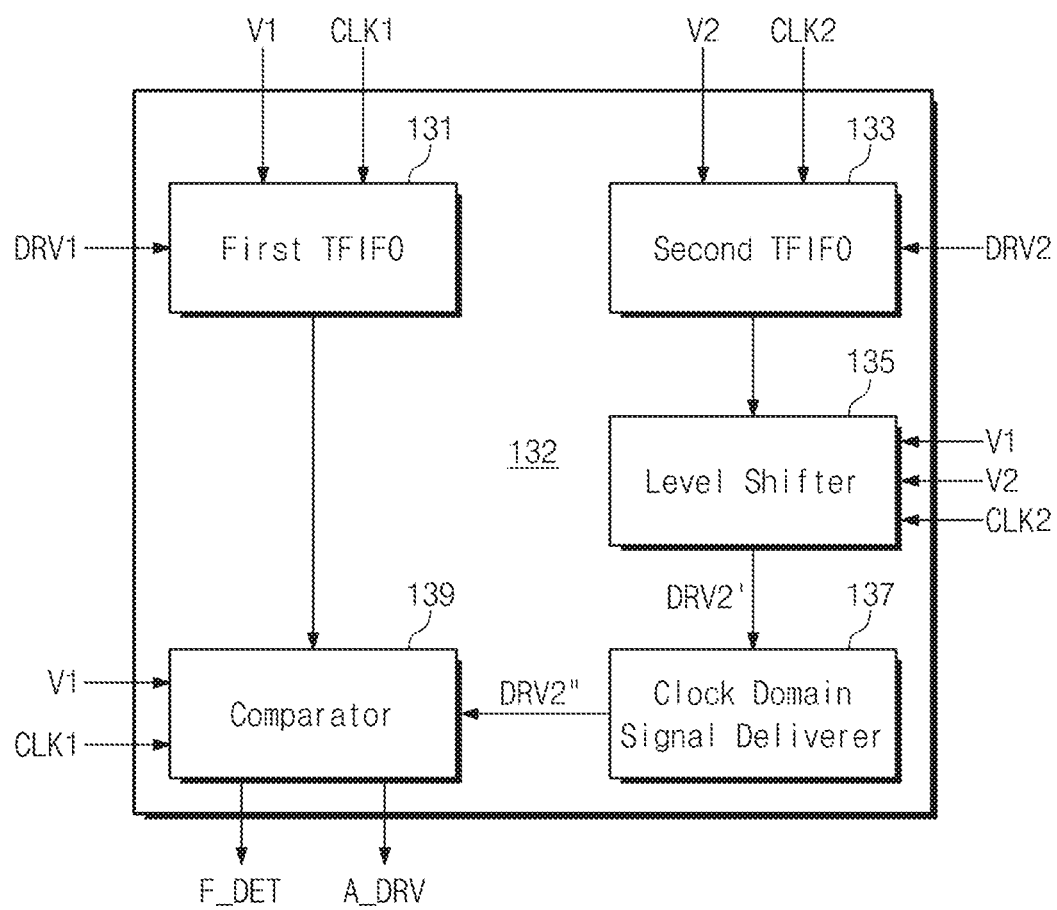
FIG. 3 is a block diagram illustrating in detail the bus flow fault sensor 132 of FIG. 2.

FIG. 3 is a block diagram illustrating in detail the bus flow fault sensor 132 of FIG. 2. Referring to FIG. 3, the bus flow fault sensor 132 includes a first trigger first-input first-output (TFIFO) 131, a second TFIFO 133, a level shifter 135, a clock domain signal deliverer 137, and a comparator 139.

The first TFIFO 131 and the second TFIFO 133 respectively store sequentially the driving signals DRV1 and DRV2 provided from the first and second processors 110 and 120. The first TFIFO 131 sequentially stores the first output signal DRV1 using the first driving voltage V1 and the first driving clock CLK1. The second TFIFO 133 sequentially stores the second output signal DRV2 using the second driving voltage V2 and the second driving clock CLK2.

The level shifter 135 shifts a voltage level of the second output signal DRV2 output from the second TFIFO 133. A voltage level of the second output signal DRV2 output from the second TFIFO 133 is generated on the basis of the second driving voltage V2. Accordingly, voltage level synchronization is required to compare the level of the second output signal DRV2 with that of the first output signal DRV1. In order to level-synchronize the second output signal DRV2, which has a level corresponding to the second driving voltage V2, to the first output signal DRV1, the level shifter 135 may use the first driving voltage V1, the second driving voltage V2, and the second driving clock CLK2. Accordingly, the level of the second output signal DRV2' output from the level shifter 135 may be shifted to the level of the first driving voltage V1.

The clock domain signal deliverer 137 synchronizes a clock of the second output signal DRV2' provided from the level shifter 135 to the first driving clock CLK1. In other words, the clock domain signal deliverer 137 converts a clock domain of the second output signal DRV2' into the first driving clock CLK1. For example, the clock domain signal deliverer 137 may synchronize a delay or a frequency of the second output signal DRV2' to that of the first driving clock CLK1. By the clock domain signal deliverer 137, the second output signal DRV2" in the domain of the first driving clock CLK1 may be output. The second output signal DRV2" has the same voltage level and clock domain as those of the first output signal DRV1.

The comparator 139 compares the first output signal DRV1 with the second output signal DRV2" of which the voltage and clock are synchronized to those of the first output signal DRV1. The comparator 139 compares the first output signal DRV1 with the second output signal DRV2" through the first driving clock CLK1 and the first driving voltage V1. The reason why is because the level and the clock domain of the second output signal DRV2" having been already synchronized to the first driving clock CLK1 and the first driving voltage V1.

When the first output signal DRV1 and the second output signal DRV2" are determined to be identical, the comparator 139 may output the detected identical signal to the actuator driving signal A_DRV. On the other hand, when the first output signal DRV1 and the second output signal DRV2" are determined not to be identical, the comparator 139 may output the fault detection signal F_DET.

Here, it has been described that the voltage level and the clock domain of the second output signal DRV2 are synchronized to those of the first output signal DRV1. However, it may be well understood that any one of the first output signal DRV1 and the second output signal DRV2 may be adjusted to the voltage level and clock domain of the other.

Figure 4:
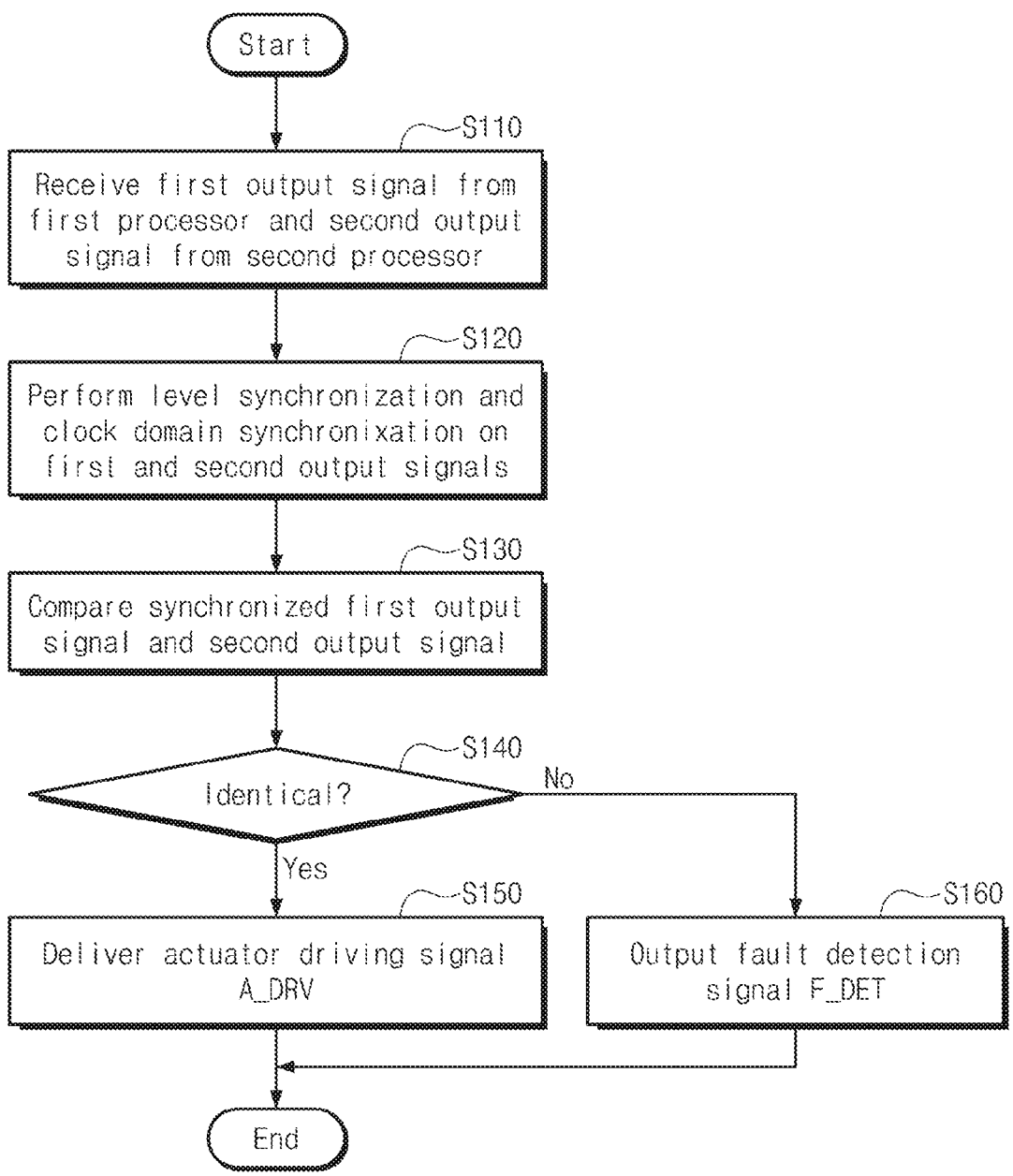
FIG. 4 is a flow chart briefly illustrating an operating of the bus flow fault sensor 132 according to an embodiment of the inventive concept.

FIG. 4 is a flow chart illustrating an operation of the bus flow fault detector 132 according to an embodiment of the inventive concept. Referring to FIG. 4, the bus flow fault sensor 132 may compare the first and second output signals DRV1 and DRV2 having different clock domains and different voltage levels to detect a fault.

In operation S110, the bus flow fault detector 132 receives the first and second output signals DRV1 and DRV2. The bus flow fault detector 132 stores the first output signal DRV1 output from the first processor 110 that operates by the first driving clock CLK1 and the first driving voltage V1. The bus flow fault detector 132 stores the second output signal DRV2 output from the second processor 120 that operates by the second driving clock CLK2 and the second driving voltage V2.

In operation S120, the bus flow fault detector 132 performs the level synchronization and clock domain synchronization of the first and second output signals DRV1 and DRV2. The bus flow fault sensor 132 may synchronize, for example, the voltage level and clock domain of the second output signal DRV2 to those of the first output signal DRV1.

In operation S130, the bus flow fault detector 132 detects whether the first output signal DRV1 matches the second output signals DRV2" of which the voltage levels and the clock domains are synchronized. In other words, the bus flow fault detector 132 compares the first output signal DRV1 and the second output signals DRV2" to detect whether they match each other.

In operation S140, the operation is branched according to whether the first output signal DRV1 matches the second output signal DRV2". When the first output signal DRV1 and the second output signal DRV2" are identical (Yes), the procedure proceeds to operation S150. On the other hand, when the first output signal DRV1 and the second output signal DRV2" are not identical (No), the procedure proceeds to operation S160.

In operation S150, the bus flow fault sensor 132 may output at least one of the first output signal DRV1 and the second output signal DRV2", which have been detected to be identical, as the actuator driving signal A_DRV.

In operation S160, the bus flow fault sensor 132 may output the fault detection signal F_DEF according to that the first output signal DRV1 and the second output signal DRV2" has been detected to be different from each other. Although not illustrated, a fault recovery operation may be followed according to the output of the fault detection signal F_DET.

Hereinbefore, a method for generating the fault detection signal F_DET and the actuator driving signal A_DRV by the bus flow fault sensor 132 of the inventive concept has been described. However, the method for generating the fault detection signal F_DET and the actuator driving signal A_DRV is just an example, and various modifications are possible.

Figure 5:
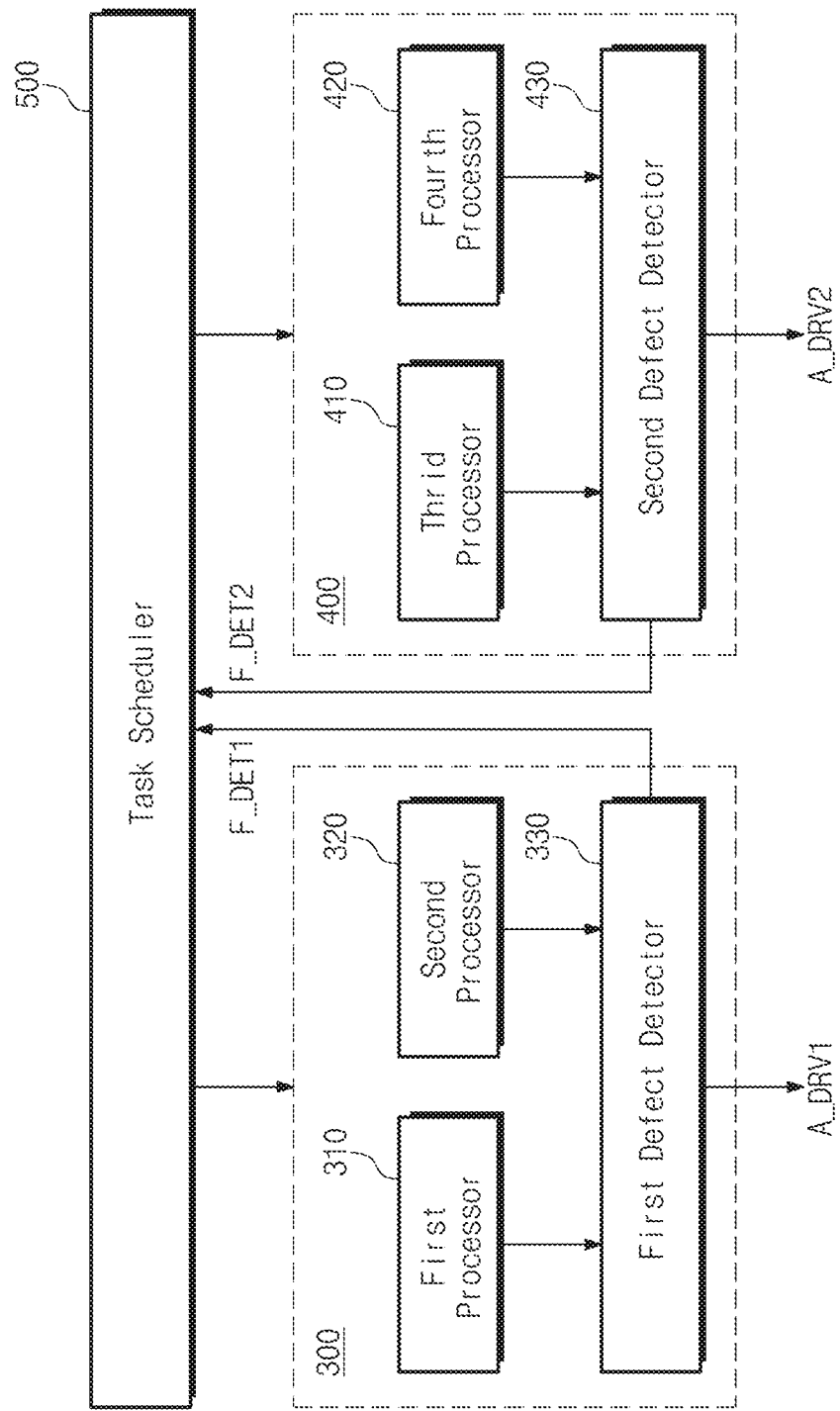
FIG. 5 is a block diagram illustrating another multi-core processor system according to another embodiment of the inventive concept.

FIG. 5 is a block diagram illustrating another multi-core processor system according to another embodiment of the inventive concept. Referring to FIG. 5, a multi-core processor system may include a plurality of clusters. A first cluster 300 may include a first processor 310, a second processor 320, and a first defect detector 330. A second cluster 400 may include a third processor 410, a fourth processor 420, and a second defect detector 430. In addition, a task scheduler 500 may be included which performs scheduling for each actuator (not illustrated) and cluster management.

An actuator driving operation for each of the first and second clusters 300 and 400 is substantially identical to that of the processor system 100 of FIG. 1. By actuator driving signals A_DRV1 and A_DRV2 respectively provided from the first and second clusters 300 and 400, it is possible to control operations of an identical actuator or different actuators.

The first and second processors 310 and 210 configuring the first cluster 300 perform a substantially identical instruction. However, the first and second processors 310 and 320 may be driven by driving voltages and driving clocks provided mutually independently. The first defect detector 330 performs clock domain and voltage level synchronizations for outputs of the first and second processors 310 and 320. In addition, the first defect detector 330 compares the synchronized output signals to detect a fault of the first cluster 300. When the fault is detected, the first defect detector 330 may generate a first fault detection signal F_DET1 to provide the generated first fault detection signal F_DET1 to the task scheduler 500. The task scheduler 500 may perform a fault recovery operation or a task reallocation operation in response to the first fault detection signal F_DET1.

The third and fourth processors 410 and 420 configuring the second cluster 400 also perform a substantially identical instruction. The first and second processors 410 and 420 may be driven by driving voltages and driving clocks provided mutually independently. The second defect detector 430 performs clock domain and voltage level synchronizations for outputs of the third and fourth processors 410 and 420. In addition, the second defect detector 430 compares the synchronized output signals to detect a fault of the second cluster 400. When the fault is detected, the second defect detector 430 may generate a second fault detection signal F_DET2 to provide the generated second fault detection signal F_DET2 to the task scheduler 500. The task scheduler 500 may perform a fault recovery operation or a task reallocation operation in response to the second fault detection signal F_DET2.

The task scheduler 500 may perform control operations for the first and second clusters 300 and 400. In particular, the task scheduler 500 may control activation and inactivation of cores of each of the first and second clusters 300 and 400, and may reconfigure a cluster unit. When the first fault detection signal F_DET1 is provided from the first cluster 300, the task scheduler 500 may reallocate the identical task to the second cluster 400. In addition, it may be assumed that the task scheduler 500 simultaneously and respectively receive the first fault detection signal F_DET1 representing the fault of the first processor 310 and the second fault detection signal F_DET2 indicating a fault of the fourth processor 420 from the first and second clusters 300 and 400. At this point, the task scheduler 500 may allocate the second processor 320 and the third processor 410, which normally operate, to a new cluster.

Hereinbefore, an embodiment in which each of a plurality of clusters includes at least two processors operating by mutually independent driving voltages and driving clocks. Each of the clusters may perform the clock domain synchronization and voltage level synchronization for outputs from the at least two processors to compare the synchronization results, and may determine whether a fault occurs according to the comparison result.

A processor system according to embodiments of the inventive concept may provide high reliability by ensuring mutual independence between cores and enabling efficient fault detection.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A processor system comprising:
   a first processor configured to generate a first output signal;
   a second processor configured to perform an identical task to the first processor, and configured to generate a second output signal; and
   a defect detector configured to compare the first output signal with the second output signal to generate a fault detection signal,
   wherein the defect detector comprises:
   a first FIFO buffer configured to receive the first output signal in synchronization with a first driving voltage and a first driving clock, and store the received first output signal;
   a second FIFO buffer configured to receive the second output signal in synchronization with a second driving voltage and a second driving clock, and store the received second output signal;
   a level shifter configured to shift, to a level of the first driving voltage, an output from the second FIFO buffer in synchronization with the second driving clock; and
   an actuator interface configured to provide an actuator driving signal to an actuator; and
   wherein the defect detector is configured to perform level synchronization or clock domain synchronization on the first output signal and the second output signal.

2. The processor system of claim 1, wherein the first and second driving voltages are respectively provided from mutually independent power supply sources and the first and second driving clocks are respectively provided from mutually independent clock generators.

3. The processor system of claim 1, wherein the first and second driving clocks are respectively provided from different phase locked loops (PLLs) or different delay locked loops (DLLs).

4. The processor system of claim 1, wherein, when the first and second output signals are determined to be identical, the defect detector outputs any one of the first and second output signals as the actuator driving signal.

5. The processor system of claim 4, wherein, when the first and second output signals are determined not to be identical, the defect detector outputs the fault detection signal.

6. The processor system of claim 1, wherein the defect detector comprises a clock domain signal deliverer configured to convert an output of the level shifter to a clock domain of the first driving clock.

7. The processor system of claim 6, wherein the defect detector comprises a comparator configured to compare an output from the first FIFO buffer and an output from the clock domain signal deliverer.

8. The processor system of claim 7, wherein the comparator compares the output from the first FIFO buffer and the output from the clock domain signal deliverer using the first driving clock and the first driving voltage.

9. The processor system of claim 1, further comprising:
   an automotive electronic system configured to drive the actuator with reference to a result of comparing the first and second output signals.

10. A fault detecting method for a processor system, which comprises a plurality of processors, the method comprising:
    receiving a first output signal from a first processor driven by a first driving voltage and a first driving clock;
    receiving a second output signal from a second processor driven by a second driving voltage and a second driving clock and configured to perform an identical task to the first processor;
    level-synchronizing the second output signal by converting a voltage level of the second output signal to a voltage level identical to a voltage level of the first driving voltage;
    clock-synchronizing the second output signal by converting a clock domain of the level-synchronized second output signal to be identical to a clock domain of the first driving clock; and
    comparing the second output signal with the first output signal to generate a fault detection signal.

11. The fault detecting method of claim 10, further comprising:
    generating the fault detection signal when the first output signal and the level-synchronized and clock-synchronized second output signal are different from each other.

12. The fault detecting method of claim 10, wherein the first and second driving voltages are respectively provided from mutually independent power supply sources and the first and second driving clocks are respectively provided from mutually independent clock generators.

* * * * *